United States Patent
DiBenedetto et al.

(10) Patent No.: US 9,896,968 B2
(45) Date of Patent: Feb. 20, 2018

(54) FORWARD COMPARTMENT BAFFLE ARRANGEMENT FOR A GEARED TURBOFAN ENGINE

(71) Applicant: United Technologies Corporation, Farmington, CT (US)

(72) Inventors: Enzo DiBenedetto, Kensington, CT (US); Fred NguyenLoc, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 1651 days.

(21) Appl. No.: 13/709,153

(22) Filed: Dec. 10, 2012

(65) Prior Publication Data

US 2014/0169941 A1    Jun. 19, 2014

Related U.S. Application Data

(60) Provisional application No. 61/677,273, filed on Jul. 30, 2012.

(51) Int. Cl.
| | |
|---|---|
| F01D 25/18 | (2006.01) |
| F01D 25/24 | (2006.01) |
| F02K 3/06 | (2006.01) |
| F02C 7/06 | (2006.01) |
| F02C 7/36 | (2006.01) |

(52) U.S. Cl.
CPC ............. *F01D 25/18* (2013.01); *F01D 25/24* (2013.01); *F02C 7/06* (2013.01); *F02C 7/36* (2013.01); *F02K 3/06* (2013.01); *F05D 2260/40311* (2013.01); *F05D 2260/602* (2013.01)

(58) Field of Classification Search
CPC .. F01D 25/18; F01D 25/24; F02C 7/06; F02C 7/36; F02K 3/06; F05D 2260/40311; F05D 2260/602
See application file for complete search history.

(56) References Cited

U.S. PATENT DOCUMENTS

| | | |
|---|---|---|
| 4,029,035 A | 6/1977 | German |
| 4,137,705 A | 2/1979 | Andersen et al. |
| 4,287,913 A | 9/1981 | Bennett et al. |
| 4,346,786 A | 8/1982 | Midgley |
| 4,393,817 A | 7/1983 | Lindberg |
| 4,395,885 A | 8/1983 | Cozby |
| 4,409,931 A | 10/1983 | Lindberg |
| 4,422,821 A | 12/1983 | Smith |
| 4,463,956 A | 8/1984 | Malott |
| 4,525,995 A | 7/1985 | Clark |
| 4,541,367 A | 9/1985 | Lindberg |
| 4,620,588 A | 11/1986 | Pfouts et al. |
| 4,683,714 A | 8/1987 | Thebert |
| 4,759,401 A | 7/1988 | Pfouts et al. |
| 5,020,318 A | 6/1991 | Vdoviak |

(Continued)

OTHER PUBLICATIONS

International search report for PCT/US2013/052728 dated Oct. 22, 2013.

(Continued)

*Primary Examiner* — Igor Kershteyn
(74) *Attorney, Agent, or Firm* — Bachman & LaPointe, P.C.

(57) ABSTRACT

A baffle within a gas turbine engine includes a cylindrical flange with a multiple of holes at least partially therearound.

24 Claims, 7 Drawing Sheets

(56) References Cited

U.S. PATENT DOCUMENTS

| | | | |
|---|---|---|---|
| 5,088,890 A | 2/1992 | Jewess | |
| 5,454,426 A | 10/1995 | Moseley | |
| 5,472,383 A | 12/1995 | McKibbin | |
| 5,641,273 A | 6/1997 | Moseley | |
| 5,813,830 A | 9/1998 | Smith et al. | |
| 6,033,450 A | 3/2000 | Krul et al. | |
| 6,561,010 B2 | 5/2003 | Wilson et al. | |
| 6,638,013 B2 | 10/2003 | Nguyen et al. | |
| 6,640,933 B2 | 11/2003 | Henry et al. | |
| 6,672,063 B1 | 1/2004 | Proeschel | |
| 6,719,524 B2 | 4/2004 | Nguyen et al. | |
| 6,810,718 B2 | 11/2004 | Wilson et al. | |
| 6,996,968 B2 | 2/2006 | Peters et al. | |
| 7,251,942 B2 | 8/2007 | Dittmar et al. | |
| 7,682,131 B2 | 3/2010 | Legare et al. | |
| 7,704,178 B2 | 4/2010 | Sheridan et al. | |
| 7,883,439 B2 | 2/2011 | Sheridan et al. | |
| 7,926,260 B2 | 4/2011 | Sheridan et al. | |
| 7,926,290 B2* | 4/2011 | Johnson | F02K 3/075 60/204 |
| 8,037,686 B2 | 10/2011 | Lasker | |
| 8,167,091 B2 | 5/2012 | Alecu et al. | |
| 8,172,716 B2 | 5/2012 | McCune | |
| 8,240,974 B2 | 8/2012 | Nyamu et al. | |
| 8,246,503 B2 | 8/2012 | Sheridan | |
| 8,276,275 B2 | 10/2012 | Sheridan | |
| 2005/0135929 A1* | 6/2005 | Waddleton | B64C 11/38 416/1 |
| 2008/0044276 A1 | 2/2008 | McCune et al. | |
| 2008/0063333 A1* | 3/2008 | Bruno | F01D 25/16 384/494 |
| 2010/0212281 A1* | 8/2010 | Sheridan | F01D 25/20 60/39.08 |
| 2011/0108360 A1* | 5/2011 | DiBenedetto | F01D 25/18 184/6.11 |
| 2012/0121378 A1 | 5/2012 | Sheridan et al. | |

OTHER PUBLICATIONS

European Office Action dated Dec. 5, 2016, issued in the corresponding European Patent Application No. 13826450.2.

* cited by examiner

US 9,896,968 B2

FORWARD COMPARTMENT BAFFLE ARRANGEMENT FOR A GEARED TURBOFAN ENGINE

The present disclosure claims priority to U.S. Provisional Patent Disclosure Ser. No. 61/677,273, filed Jul. 30, 2012.

BACKGROUND

The present disclosure relates to a lubrication system for a gas turbine engine and, more particularly, to a baffle which reduces oil windage.

Aircraft gas turbine engines include a lubrication system to supply oil to various components. Under certain conditions, the oil may be churned at a high velocity and thereby become aerated. If the oil is not quieted and deaerated, the oil may not be effectively scavenged.

SUMMARY

A baffle within a gas turbine engine according to one disclosed non-limiting embodiment of the present disclosure includes a cylindrical flange with a multiple of holes at least partially therearound.

In a further embodiment of the foregoing embodiment, the cylindrical flange is defined around an engine central longitudinal axis.

In a further embodiment of any of the foregoing embodiments, the baffle further comprising an oil recovery gutter axially offset from the multiple of holes. In the alternative or additionally thereto, in the foregoing embodiment the oil recovery gutter is radially offset from the flange.

In a further embodiment of any of the foregoing embodiments, the multiple of holes are defined in a multiple of rows.

In a further embodiment of any of the foregoing embodiments, the cylindrical flange extends from a bearing support.

In a further embodiment of any of the foregoing embodiments, the cylindrical flange extends from a front center body.

A gas turbine engine according to another disclosed non-limiting embodiment of the present disclosure includes an epicyclic gear system and a baffle with a multiple of holes, the baffle at least partially surrounds the epicyclic gear system.

In a further embodiment of the foregoing embodiment, the baffle defines an oil recovery gutter. In the alternative or additional thereto, in the foregoing embodiment the oil recovery gutter is radially outboard of an oil passage. In the alternative or additional thereto, in the foregoing embodiment the multiple of holes are downstream of the oil recovery gutter. In the alternative or additional thereto, in the foregoing embodiment the oil passage extends through a ring gear of the epicyclic gear system. In the alternative or additional thereto, in the foregoing embodiment the epicyclic gear system is a planetary gear system. In the alternative or additional thereto, in the foregoing embodiment the epicyclic gear system is a star gear system.

In a further embodiment of any of the foregoing embodiments, the cylindrical flange extends from a bearing support.

In a further embodiment of any of the foregoing embodiments, the cylindrical flange extends from a front center body.

In a further embodiment of any of the foregoing embodiments, the gas turbine engine further comprising a knife seal engaged with the baffle. In the alternative or additional thereto, in the foregoing embodiment the oil recovery gutter is manufactured of a softer material than the knife seal.

In a further embodiment of any of the foregoing embodiments, the gas turbine engine further comprising a bypass channel defined by said baffle.

In a further embodiment of any of the foregoing embodiments, the baffle defines an axial length approximately 70%+25%/−30% of an axial length of a front center body.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
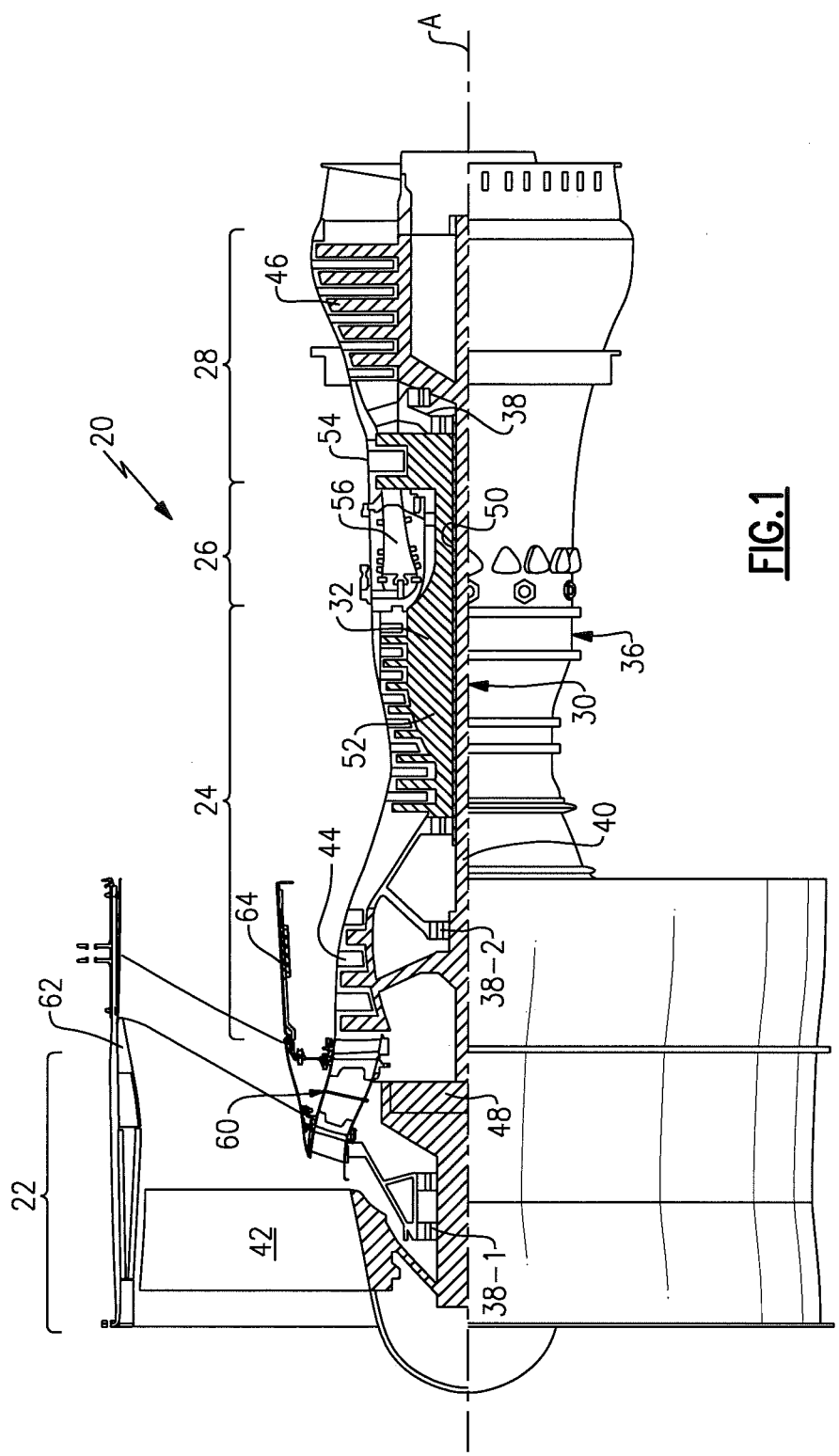
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a fan bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be appreciated that the concepts described herein are not limited to use with turbofans as the teachings may be applied to other types of turbine engines such as a three-spool (plus fan) engine wherein an intermediate spool includes an intermediate pressure compressor (IPC) between the LPC and HPC and an intermediate pressure turbine (IPT) between the HPT and LPT.

The engine 20 generally includes a low spool 30 and a high spool 32 mounted for rotation about an engine central longitudinal axis A relative to an engine case assembly 36 via several bearing structures 38. The low spool 30 generally includes an inner shaft 40 that interconnects a fan 42, a low pressure compressor 44 ("LPC") and a low pressure turbine 46 ("LPT"). The inner shaft 40 drives the fan 42 through a geared architecture 48 to drive the fan 42 at a lower speed than the low spool 30.

The high spool 32 includes an outer shaft 50 that interconnects a high pressure compressor 52 ("HPC") and high pressure turbine 54 ("HPT"). A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the low pressure compressor 44 then the high pressure compressor 52, mixed with the fuel and burned in the combustor 56, then expanded over the high pressure turbine 54 and the low pressure turbine 46. The turbines 54, 46 rotationally drive the respective low spool 30 and high spool 32 in response to the expansion.

In one non-limiting embodiment, the gas turbine engine 20 is a high-bypass geared architecture engine in which the bypass ratio is greater than about six (6:1). The geared architecture 48 can include an epicyclic gear train, such as a planetary gear system, star gear system or other gear system. The example epicyclic gear train has a gear reduction ratio of greater than about 2.3, and in another example is greater than about 2.5. The geared turbofan enables operation of the low spool 30 at higher speeds which can increase the operational efficiency of the low pressure compressor 44 and low pressure turbine 46 and render increased pressure in a fewer number of stages.

A pressure ratio associated with the low pressure turbine 46 is pressure measured prior to the inlet of the low pressure turbine 46 as related to the pressure at the outlet of the low pressure turbine 46 prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 44, and the low pressure turbine 46 has a pressure ratio that is greater than about five (5:1). It should be appreciated, however, that the above parameters are only exemplary of one embodiment of a geared architecture engine and that the present disclosure is applicable to other gas turbine engines including direct drive turbofans.

The high bypass ratio results in a significant amount of thrust. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("T"/518.7)$^{0.5}$. in which "T" represents the ambient temperature in degrees Rankine. The Low Corrected Fan Tip Speed according to one non-limiting embodiment of the example gas turbine engine 20 is less than about 1150 fps (351 m/s).

Figure 2:
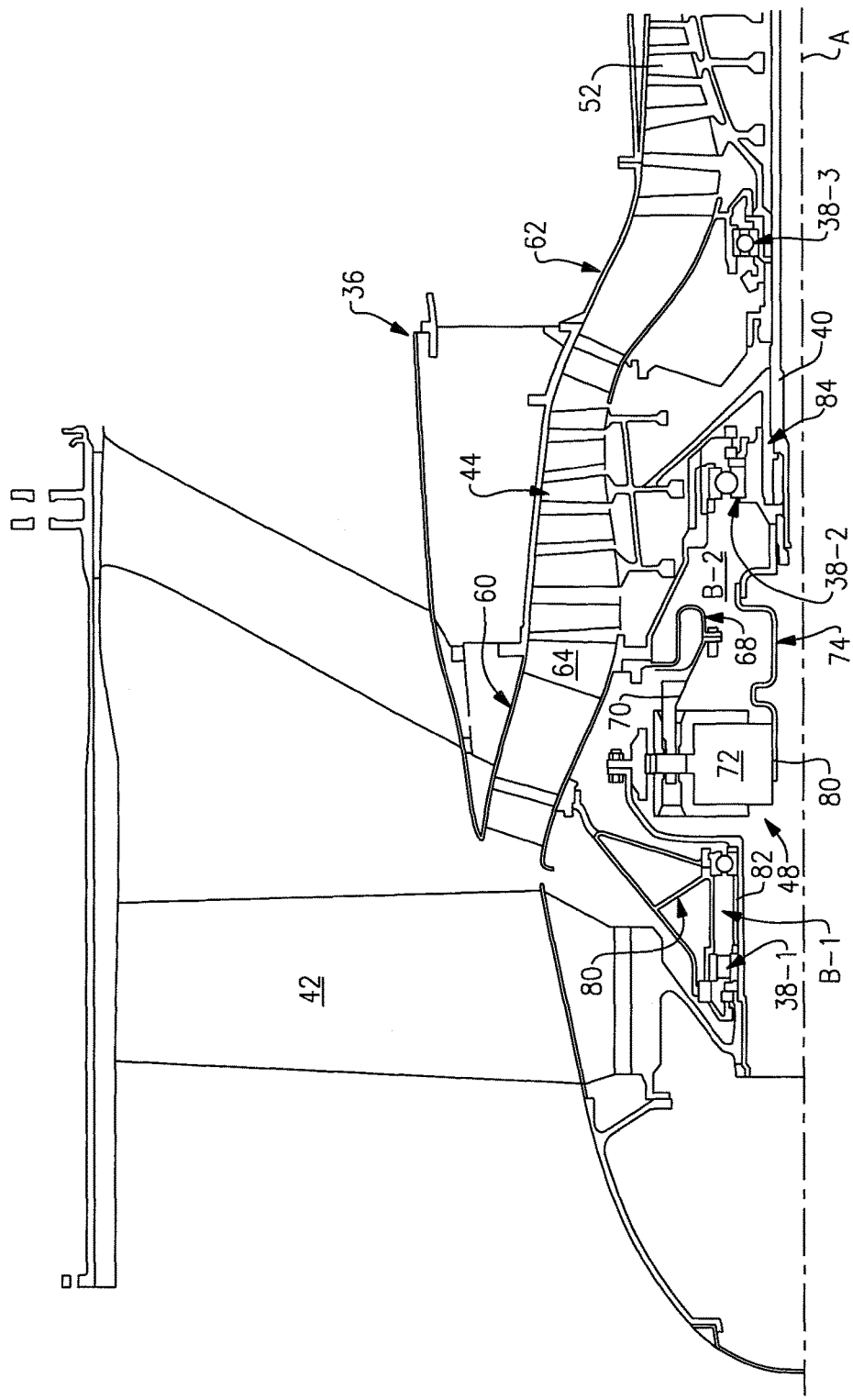
FIG. 2 is an expanded schematic cross-section of the gas turbine engine.

With reference to FIG. 2, the engine case assembly 36 proximate the compressor section 24 generally includes a front center body 60 and an intermediate case 62 aft of the front center body 60. The front center body 60 generally defines an annular core flow path 64 for core airflow into the low pressure compressor 44. The intermediate case 62 continues the core flow path 64 into the high pressure compressor 52. The core flow path 64 defined by the intermediate case 62 is generally radially inward of the core flow path 64 defined by the front center body 60 to form a "wasp waist" gas turbine engine architecture. It should be appreciated that various case structures may alternatively or additionally be provided, yet benefit from the architecture described herein.

A #2 bearing structure 38-2 at least partially supports the inner shaft 40 relative to the front center body 60. A #3 bearing structure 38-3 at least partially supports the outer shaft 50 relative the intermediate case 62. That is, the #2 bearing structure 38-2 generally supports the low spool 30 and the #3 bearing structure 38-3 generally supports the high spool 32. It should be appreciated that various systems such as thrust bearing structures, angled roller bearing structures and other arrangements will benefit herefrom.

A flex support 68 (illustrated schematically) epicyclic gear system 72 provides a flexible attachment of an epicyclic gear system 72 within the front center body 60. The flex support 68 reacts the torsional loads from the epicyclic gear system 72 and facilitates vibration absorption as well as other support functions. A centering spring 70—a generally cylindrical cage-like structural component with a multiple of beams that extend between flange end structures—resiliently positions the #2 bearing structure 38-2 with respect to the low spool 30.

The low spool 30 drives the epicyclic gear system 72 of the geared architecture 48 in the disclosed non-limiting embodiment through a coupling shaft 74. The coupling shaft 74 transfers torque to the epicyclic gear system 72 as well as facilitates the segregation of vibrations and other transients.

A #1/1.5 bearing support 80 and the front center body 60 define a forwardmost bearing compartment B-1. It should be appreciated that various bearing structures and seals may be supported by #1/1.5 bearing support 80 to contain oil and support rotation of a fan output shaft 82 which connects the geared architecture 48 with the fan 42.

Figure 3:
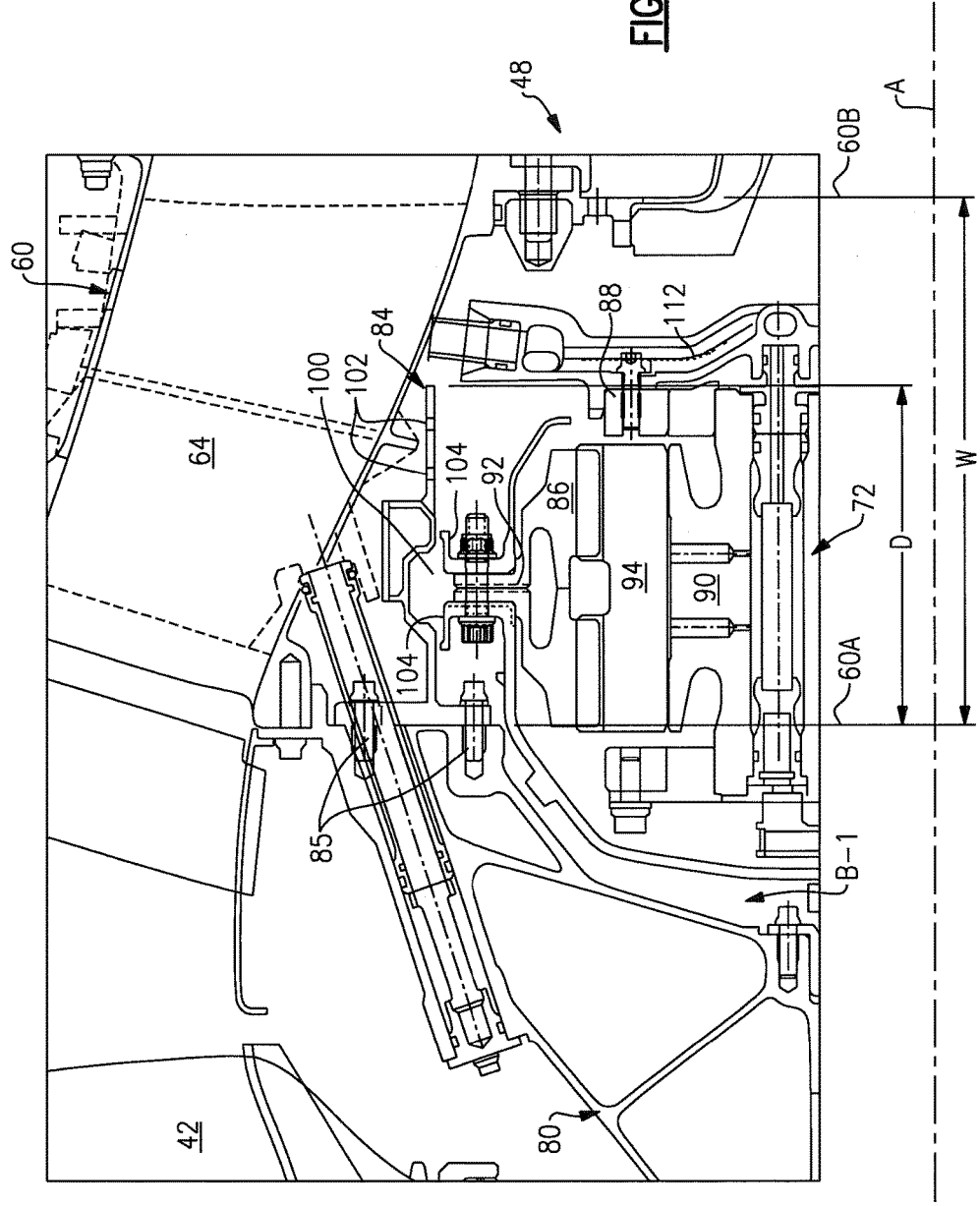
FIG. 3 is expanded schematic cross-section of a geared architecture of the gas turbine engine with a baffle arranged therearound.

With reference to FIG. 3, a baffle 84 is mounted to the #1/1.5 bearing support 80 to define a cylindrical flange that extends axially therefrom relative to the engine central longitudinal axis A. The baffle 84 may be radially arranged either completely or partially around the epicyclic gear system 72. That is, the baffle 84 is defined radially outboard of a ring gear 86 of the epicyclic gear system 72. Oil is supplied through an epicyclic carrier 88 and into each journal pin 90 thereof to communicate outwardly and lubricate and cool the epicyclic gear system 72.

Oil is radially expelled through the ring gear 86 of the epicyclic gear system 72 through a multiple of oil passages 92 (one shown) toward the baffle 84 which includes an oil recovery gutter 100 axially aligned therewith. That is, the oil recovery gutter 100 is a radially displaced section that is axially aligned with the multiple of oil passages 92 to receive oil slung therefrom. It should be appreciated that the various supply and return passages may alternatively or additionally provided.

Figure 4:
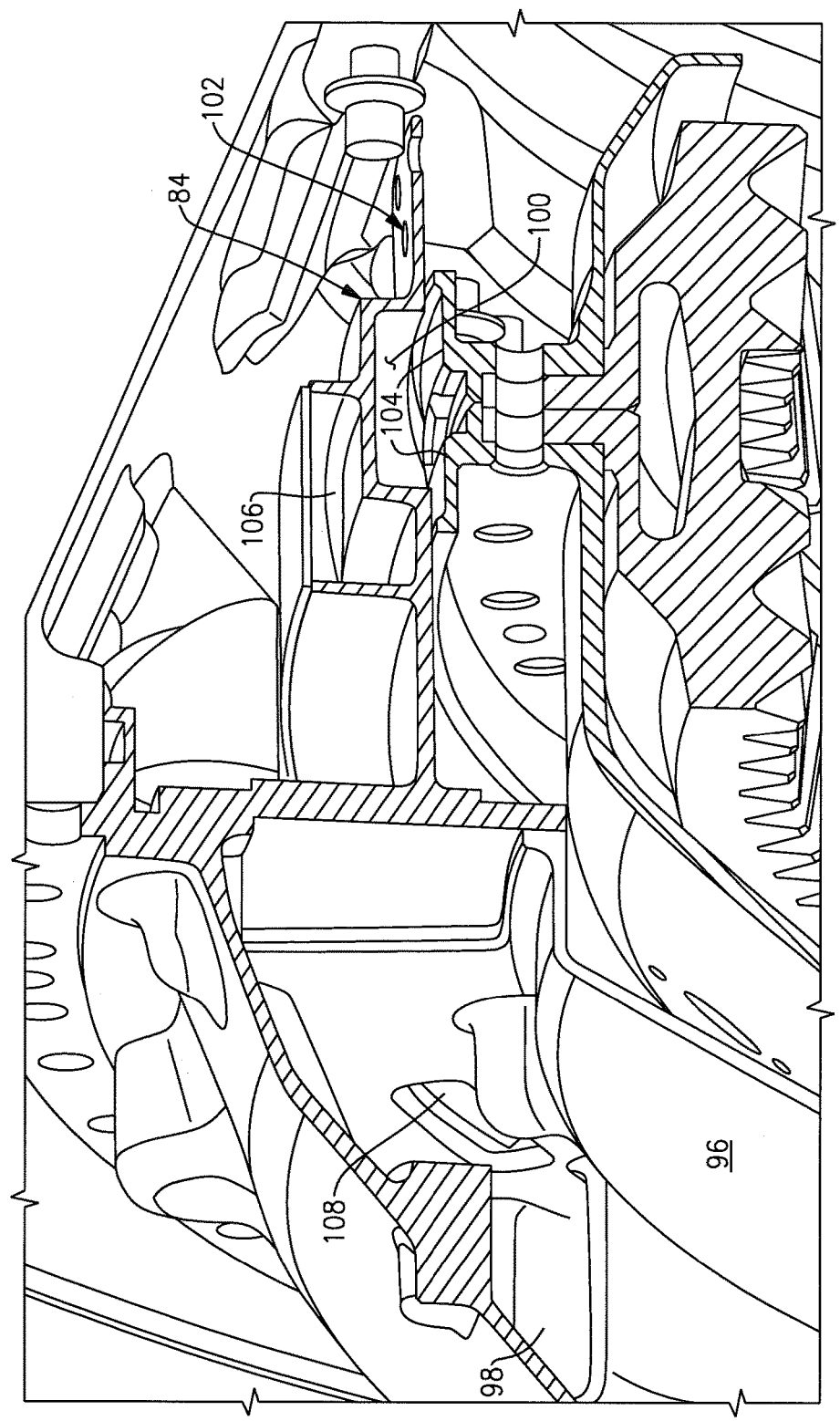
FIG. 4 is expanded perspective cross-section of the baffle mounted to a bearing support according to one disclosed non-limiting embodiment.

Radially outward directed knife seals 104 facilitate the direction of oil from the oil passages 92 into the oil recovery gutter 100 for communication into an auxiliary tank 96 through an inlet 98 (FIG. 4). In one disclosed non-limiting embodiment, the oil recovery gutter 100 may be manufactured of a relatively softer material than the knife seals 104 so that the spinning knife seals 104 can rub on the baffle 84 without effect to the flexibly mounted epicyclic gear system 72. It should be appreciated that other interfaces may be utilized.

The baffle 84 includes a multiple of baffle holes 102 (also shown in FIG. 5) axially displaced form the oil recovery gutter 100. The multiple of baffle holes 102 may form a full 360 degree, circular structure as illustrated in the disclosed, non-limiting embodiment, but may alternatively be less than 360 degrees should, for example, the oil slung off the epicyclic gear system 72 is limited to less than the full 360 degrees.

Figure 6:
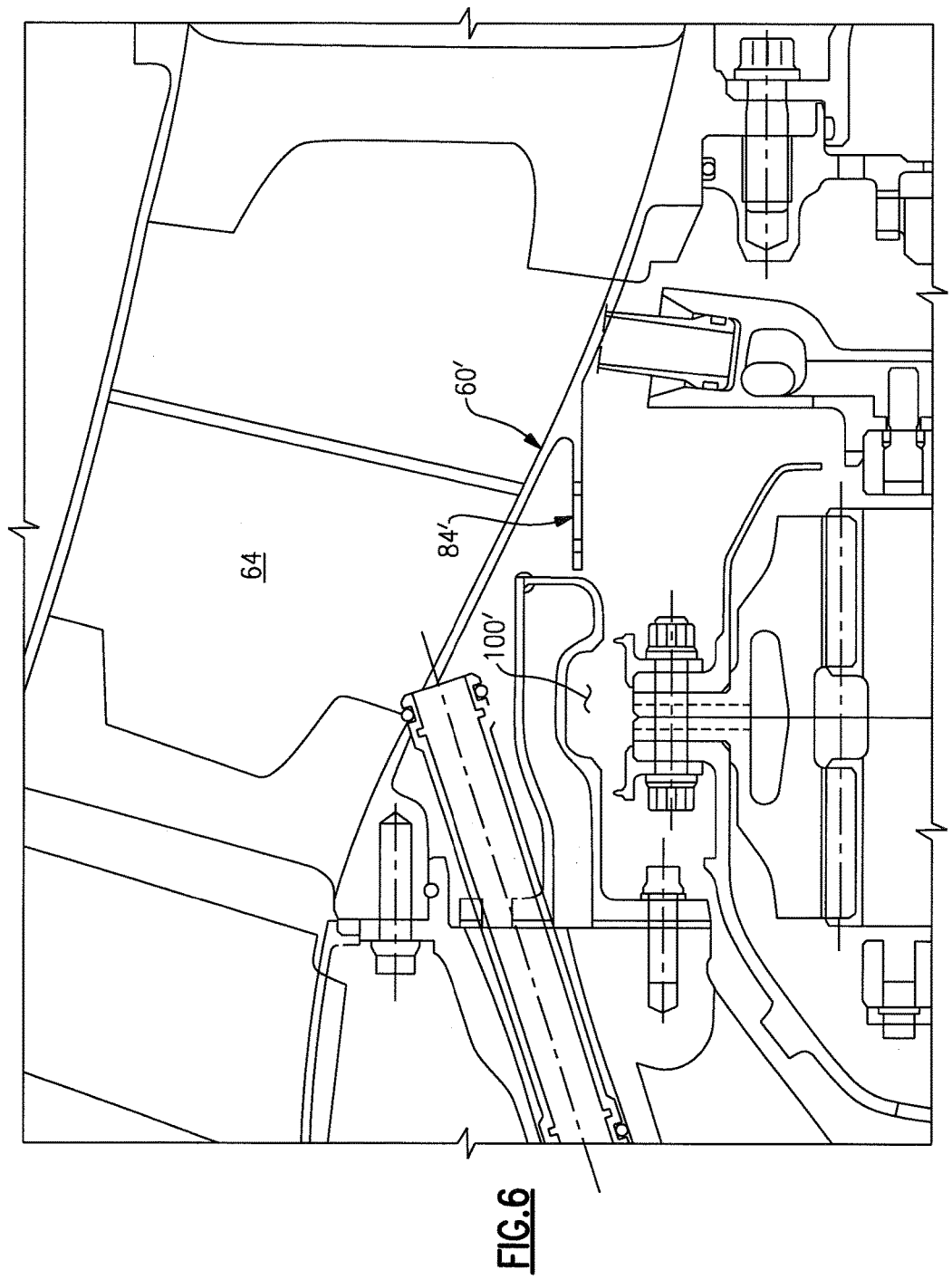
FIG. 6 is expanded perspective cross-section of the baffle mounted to a front center body according to another disclosed non-limiting embodiment.

The baffle 84, in one disclosed non-limiting embodiment, defines the oil recovery gutter 100. (FIG. 6). The baffle 84, in this disclosed non-limiting embodiment, projects into the front center body 60, starting from a similar axial position at the forward most inner diameter bolt flange 60A of the front center body 60 an axial distance D that is approximately 70%+25%/−30% of an axial length W of the front center body 60 from the forward most inner diameter bolt flange 60A to the aft most, inner diameter bolt flange 60B.

In another disclosed non-limiting embodiment the baffle 84" is a component separate from an oil recovery gutter 100' such as an integral flange extension from the front center body 60'

The baffle 84 in the disclosed non-limiting embodiment is located proximate a rear of the forwardmost bearing compartment B-1 that may be defined in part by an oil supply manifold 112. A separate area in the forwardmost bearing compartment B-1 thereby operates as a compartment sump 106 from which quiescent oil is scavenged (FIG. 7).

Figure 5:
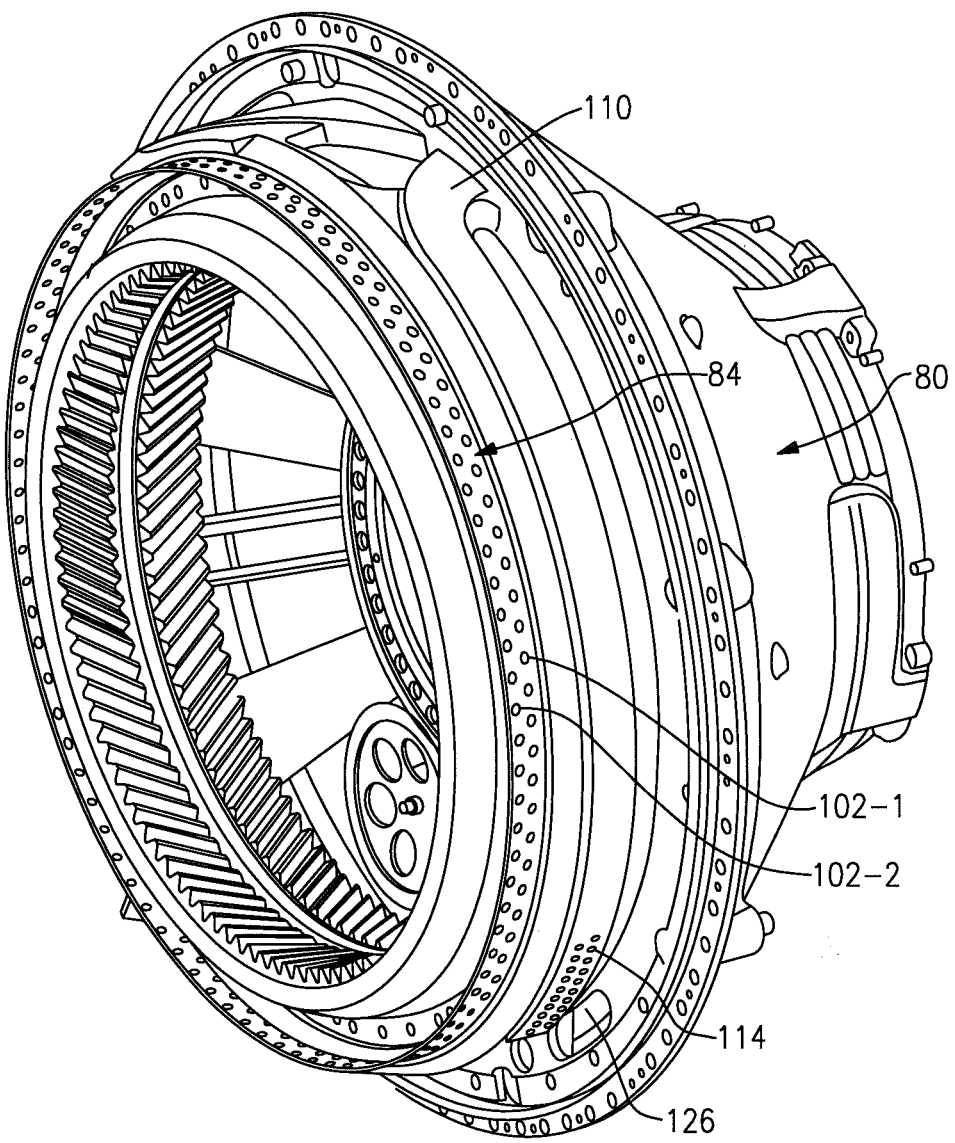
FIG. 5 is a perspective view of the baffle mounted to the bearing support.

With reference to FIG. 5, the baffle holes 102 may be arranged in a multiple of rows. The first row of baffle holes 102-1 may, in the disclosed, non-limiting embodiment include eighty-nine (89) holes +/−50% and the second row of baffle holes 102-2 may, in the disclosed, non-limiting embodiment include ninety (90) holes +/−50%. It should be appreciated that other numbers of rows, number of baffle holes as well as the size and shape of the baffle holes 102 may alternatively or additionally be provided. It should also be appreciated that the baffle holes 102 may be utilized in any gas turbine engine structure that generates highly energized oil that is to be quieted and scavenged inclusive or exclusive of a geared architecture.

Figure 7:
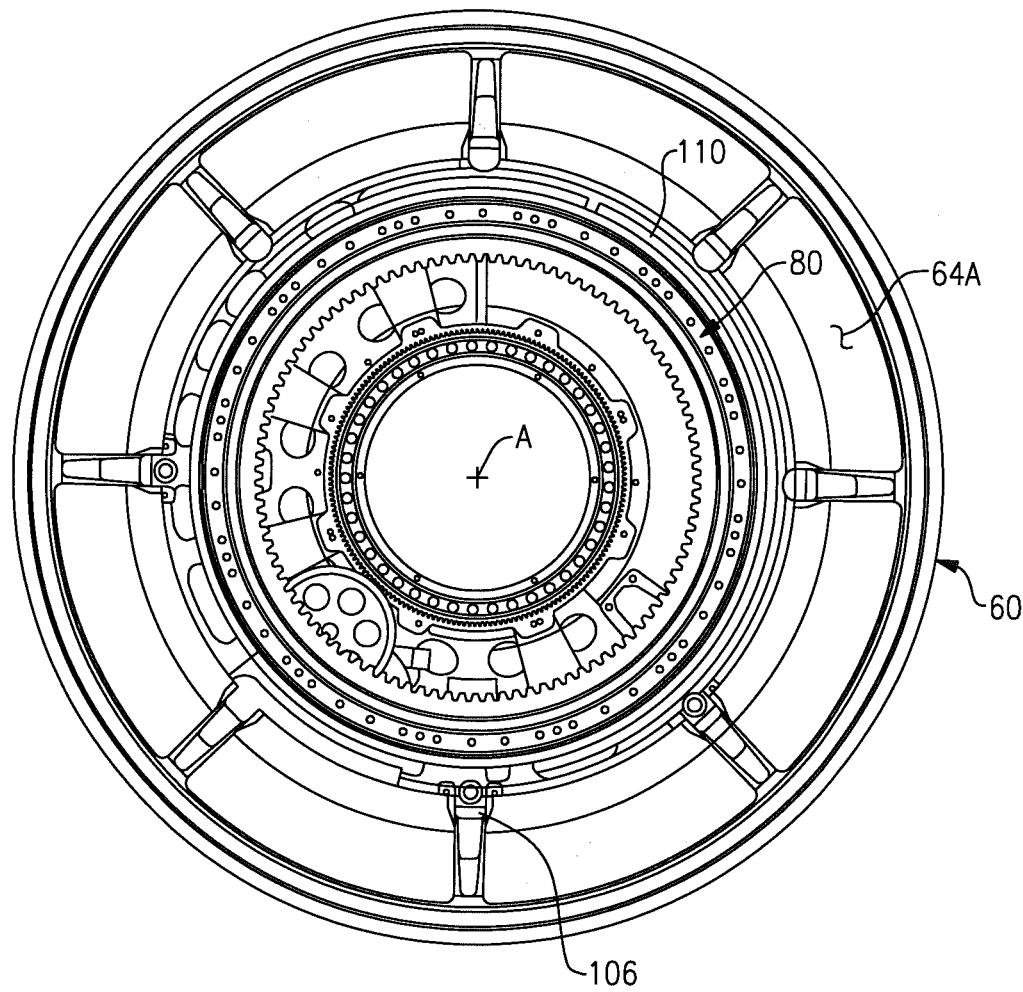
FIG. 7 is an end view of a front center body and bearing support with a baffle.

The baffle holes 102 slow and at least partial de-aerate the high-energy oil slung from the epicyclic gear system 72 prior to migration toward the auxiliary tank 96 and ultimately to the compartment sump 106 (FIG. 7).

As the auxiliary tank 96 becomes full, the oil overflows into a bypass channel inlet 108 of a bypass channel 110 that may be defined by the #1/1.5 bearing support 80 or the baffle 84. The oil is communicated by the bypass channel 110 around the #1/1.5 bearing support 80 for release into the compartment sump 106 (FIG. 7) through a multiple of bypass holes 114. The oil may then be scavenged therefrom. It should be appreciated that other oil communication arrangements and paths may alternatively or additionally be provided.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be appreciated that steps may be performed in any order, separated or combined unless otherwise indicated and will still benefit from the present disclosure.

The foregoing description is exemplary rather than defined by the limitations within Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. An engine case assembly within a gas turbine engine comprising:
    a baffle located radially inboard of an annular core flow path of the gas turbine engine, said baffle defined around an engine central longitudinal axis, wherein said baffle defines an axial length approximately 70%+ 25%/−30% of an axial length of said front center body from a forward most inner diameter bolt flange to an aft most inner diameter bolt flange, said baffle having a cylindrical flange with a multiple of holes at least partially therearound.

2. The assembly as recited in claim 1, wherein said baffle projects into the front center body, starting from a similar axial position at the forward most inner diameter bolt flange.

3. The assembly as recited in claim 1, further comprising an oil recovery gutter axially offset from said multiple of holes.

4. The assembly as recited in claim 3, wherein said oil recovery gutter is radially offset from said flange.

5. The assembly as recited in claim 1, wherein said multiple of holes are defined in a multiple of rows.

6. The assembly as recited in claim 1, wherein said cylindrical flange extends from a bearing support.

7. The assembly as recited in claim 1, wherein said cylindrical flange extends from the front center body.

8. A gas turbine engine comprising:
    an epicyclic gear system with a multiple of oil passages that extend through a ring gear of said epicyclic gear system;
    a bearing support;
    a baffle mounted to said bearing support to at least partially surround said epicyclic gear system, said baffle having an oil recovery gutter outboard of said multiple of oil passages, and a multiple of holes downstream of said oil recovery gutter, said oil recovery gutter axially aligned with said multiple of oil passages to receive oil slung therefrom.

9. The gas turbine engine as recited in claim 8, wherein said epicyclic gear system is a planetary gear system.

10. The gas turbine engine as recited in claim 8, wherein said epicyclic gear system is a star gear system.

11. The gas turbine engine as recited in claim 8, wherein said bearing support is a #1/1.5 bearing support that defines a cylindrical flange that extends axially therefrom relative to an engine central longitudinal axis.

12. The gas turbine engine as recited in claim 11, wherein said cylindrical flange extends from a front center body that defines the annular core flow path.

13. The gas turbine engine as recited in claim 8, further comprising a knife seal engaged with said baffle.

14. The gas turbine engine as recited in claim 8, wherein said oil recovery gutter is manufactured of a softer material than said knife seal.

15. The gas turbine engine as recited in claim 8, further comprising a bypass channel defined by said baffle.

16. The gas turbine engine as recited in claim 8, wherein said baffle defines an axial length approximately 70%+ 25%/−30% of an axial length of a front center body.

17. The assembly as recited in claim 8, wherein said oil is radially expelled through a ring gear of the epicyclic gear system through the multiple of oil passages toward the baffle.

18. An engine case assembly a gas turbine engine comprising:
- a front center body that at least partially defines an annular core flow path; and
- a baffle that extends from said front center body forward with respect to the core airflow through the annular core flow path into a low pressure compressor, said baffle extends toward a separate oil recover gutter.

19. The assembly as recited in claim 18, wherein said baffle is integral with said front center body.

20. The assembly as recited in claim 18, wherein said baffle extends toward a an oil recover gutter.

21. The assembly as recited in claim 20, wherein said baffle includes a cylindrical flange with multiple of holes at least partially therearound.

22. The assembly as recited in claim 21, wherein said baffle is separate from said oil recover gutter.

23. The assembly as recited in claim 18, further comprising an oil recovery gutter axially offset from said multiple of holes.

24. The assembly as recited in claim 18, further comprising an epicyclic gear system with a multiple of oil passages that extend through a ring gear of said epicyclic gear system, said multiple of holes are axially offset from said multiple of oil passages.

\* \* \* \* \*